United States Patent [19]

Collins

[11] 4,094,727
[45] June 13, 1978

[54] SHEET SPLICER

[75] Inventor: Joseph Martin Collins, Ontario, N.Y.

[73] Assignee: Burroughs Corporation, Detroit, Mich.

[21] Appl. No.: 751,657

[22] Filed: Dec. 17, 1976

[51] Int. Cl.² .................... B65H 21/00; B31F 5/06
[52] U.S. Cl. ........................... 156/505; 83/453; 101/227; 156/511; 242/56.6; 242/58.1
[58] Field of Search ............... 156/505, 506, 511, 159, 156/304, 541, 542; 101/227; 83/453; 242/58.1, 59, 56.6

[56] References Cited

U.S. PATENT DOCUMENTS

| 2,724,436 | 11/1955 | Constantine | 156/506 X |
| 3,169,895 | 2/1965 | Sohn | 156/541 X |
| 3,554,842 | 1/1971 | Byrt | 156/505 |
| 3,773,598 | 11/1973 | Taeffner et al. | 156/505 |
| 3,824,143 | 7/1974 | Cooper et al. | 156/505 X |
| 3,957,567 | 5/1976 | Pursell et al. | 156/505 |
| 4,009,065 | 2/1977 | Mikulas | 156/159 |

Primary Examiner—Douglas J. Drummond
Assistant Examiner—Thomas Bokan
Attorney, Agent, or Firm—Lynn L. Augspurger; Edward J. Feeney; Kevin R. Peterson

[57] ABSTRACT

Disclosed is a sheet splicer for splicing sheets of paper, sheet or film, especially for splicing paper rolls together to form a continuous web joining the old and new rolls of paper when used in continuous web printing presses so that they can be spliced together by a butt end splice. A traverse blade cuts both the old and new plies along a butt edge line. The blade is followed by a tape applicator and paper stripper which strips the selvage and then joins the plies together as a butt edge seam of the old and new sheets. The splicer is designed as a stand alone unit or as an in-place attachment for a printing press.

6 Claims, 6 Drawing Figures

SHEET SPLICER

BACKGROUND OF THE INVENTION

This invention relates to sheet splicers and particularly to splices which are adapted to act as butt splices for sheets of paper or film or rolls thereof. The splicer according to this invention is particularly adapted to joining paper in a paper press with a new roll of paper so that the press can continue to print while the paper web is supplied to the press after the old and new webs have been joined together.

Butt splicers have not been utilized heretofore in rotary web press orientations. It is for this environment that the sheet butt splicer in accordance with the present invention is particularly adapted.

However, other devices have been devised to clamp two sheets together and to cut them and tape the splice. Those tape splicers have for instance been used for taping together magnetic tape and the like. In general the mechanism in accordance with the present invention is suitable for both applications. But it is particularly adapted to join sheets together to form a continuous roll web of the old and new paper supplies of a rotary web printing apparatus.

In accordance with my invention I have provided a new sheet butt splicer having a splicing table and a clamping structure for clamping sheets to be spliced to the table. A splicer blade cutter is drawn across the sheet to be spliced to cut and define the butt splice edges for each sheet to be spliced together. A tape applicator is provided for taping the butt edge splices together where each meets. The selvage edges of the plies are stripped away before the tape is applied. A tape trimmer is provided for trimming the edges of the butt splice so that the tape is trimmed off along the edges of the spliced paper.

A more complete understanding of my invention in its preferred embodiment will be had after review of the following description with reference to the accompanying drawings in which.

Figure 1:
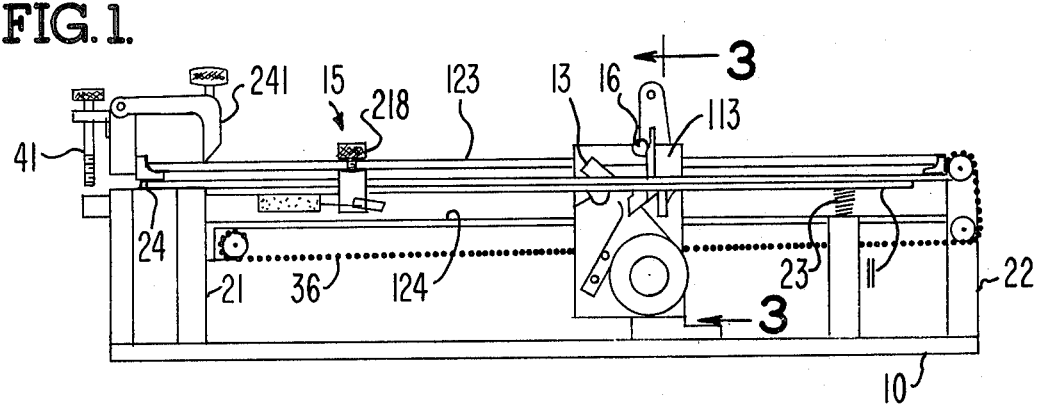
FIG. 1 is a side elevation of the sheet butt splicer in accordance with the preferred embodiment of my invention.

Turning now to the illustrated embodiment of my invention in greater detail, it will be seen that FIG. 1 illustrates the overall mechanical interconnection of the butt splicer 10.

It should be here noted that the Figures herein may be considered schematic drawings in order to better represent for the purposes of this description the preferred embodiment of my invention. Minor details have been eliminated in order to highlight the details of the butt splicer 10. A slavish reproduction of my invention should not be expected in a commercial product because various modifications and adaptations to the disclosure of my preferred embodiment may be made by those skilled in the art in order to obtain a commercial product.

Figure 5:
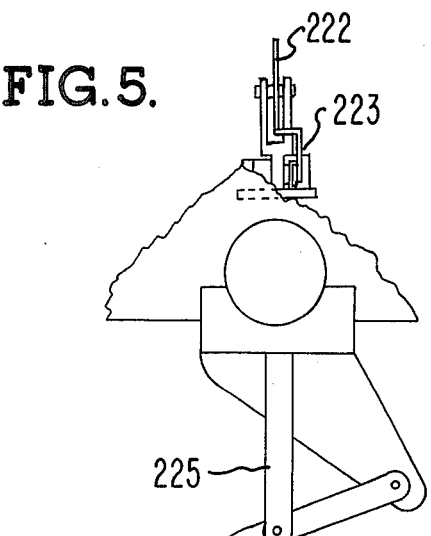
FIG. 5 is a top plan view of a detail of the paper cut off.
Figure 6:
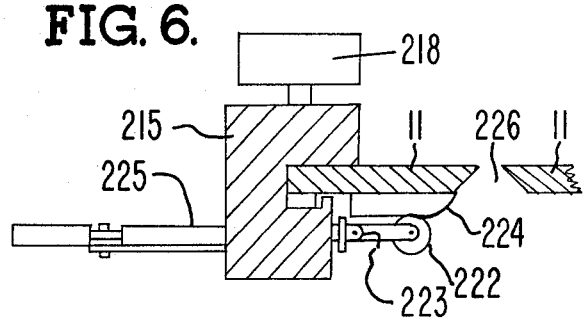
FIG. 6 is a side section of the FIG. 5 cut off.
Figure 4:
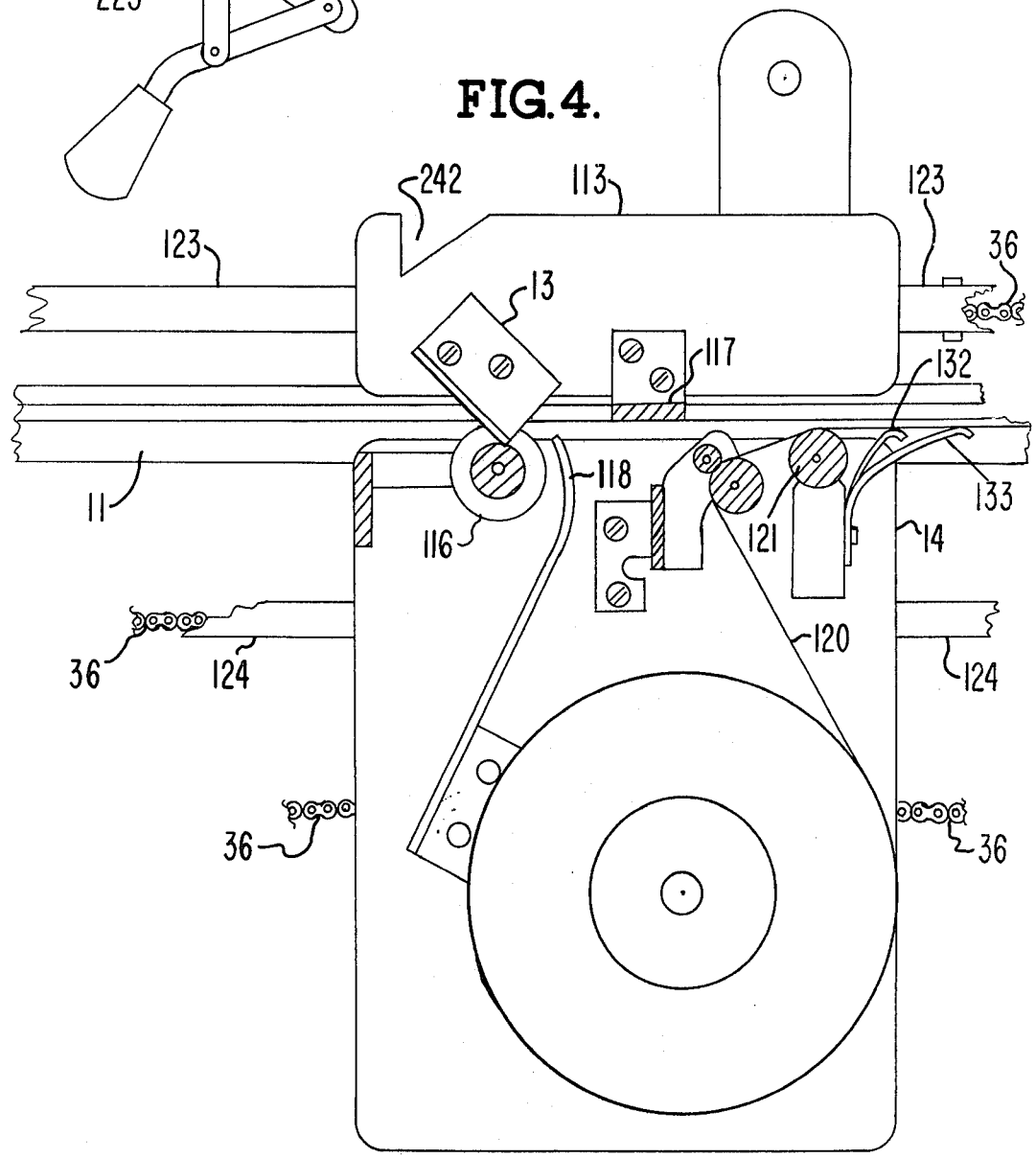
FIG. 4 is a sectional view of the splicer taken along the lines 4—4 FIG. 3.

With this in mind, it will be seen that the butt splicer 10 has been provided with a splicing table 11 and a clamping structure 12 for clamping a sheet to be spliced to the splicing table 11. A splicer blade cutter 13 has been provided and is adapted to be drawn across the sheets clamped between the table and clamping structure and intended to be spliced, to cut the sheets and define by the cutting action a butt edge for each sheet to be spliced. A tape applicator 14 is likewise provided for taping together the butt edges of the to-be-spliced sheet where they meet after they have been cut and defined by the cutter blade 13. I have also provided first and second tape trimming attachments 15 and 16 respectively. The first tape trimming attachment 15 is illustrated in greater detail in FIGS. 5 and 6, while the second 16 is shown in FIG. 4.

In order to implement this general structure just outlined of my preferred embodiment, I have also provided various details which greatly enhance the operation of the butt splicer.

Figure 2:
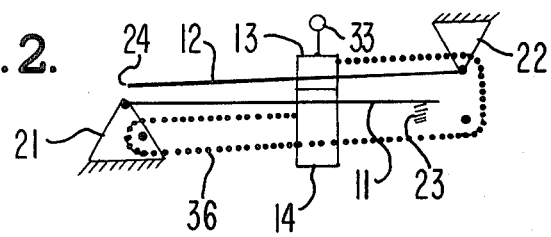
FIG. 2 is a schematic structural illustration.

FIG. 2 illustrates schematically the clamping structure. The table 11 is pivoted at one end on a first frame post 21. The clamping structure 12 is likewise pivoted on a frame post 22. The points of pivot are at opposite ends of the table and because the table is biased by spring 23 against the clamping structure 12 and the free end of the clamping structure 12 is designed to be clamped to the frame of the butt splicer 10, a tight clamp of the sheets may be obtained.

Preferably the free end 24 of the clamping structure 12 is clamped tightly against the pivot point of the table 11. The other end of the clamping structure 12 is designed to lie on a plane parallel with and in contact with end 24 in frame 21 or to lie at dead center so that a very tight clamp is achieved. Since the spring biased end of the table slides on the clamping surface as the clamp is closed, this may be considered to be a dead center interference clamp.

Along this table the tape applicator may be drawn. The tape applicator 14 is functionally connected to the blade cutter 13 by a tractor chain drive 36. The handle 33 for the cutter blade 13 is mounted on the blade cutter support 113 and connected thereto is one end of the tractor chain 36, which, as will be seen in FIG. 2, is drawn back around the pivot 22, then beneath the table 11, and back around to the center of the tape applicator 14. Thus the movement of the blade 13 pulls the tape applicator 14 synchronously to follow in the same direction and for the same distance as that of the blade 13.

Figure 3:
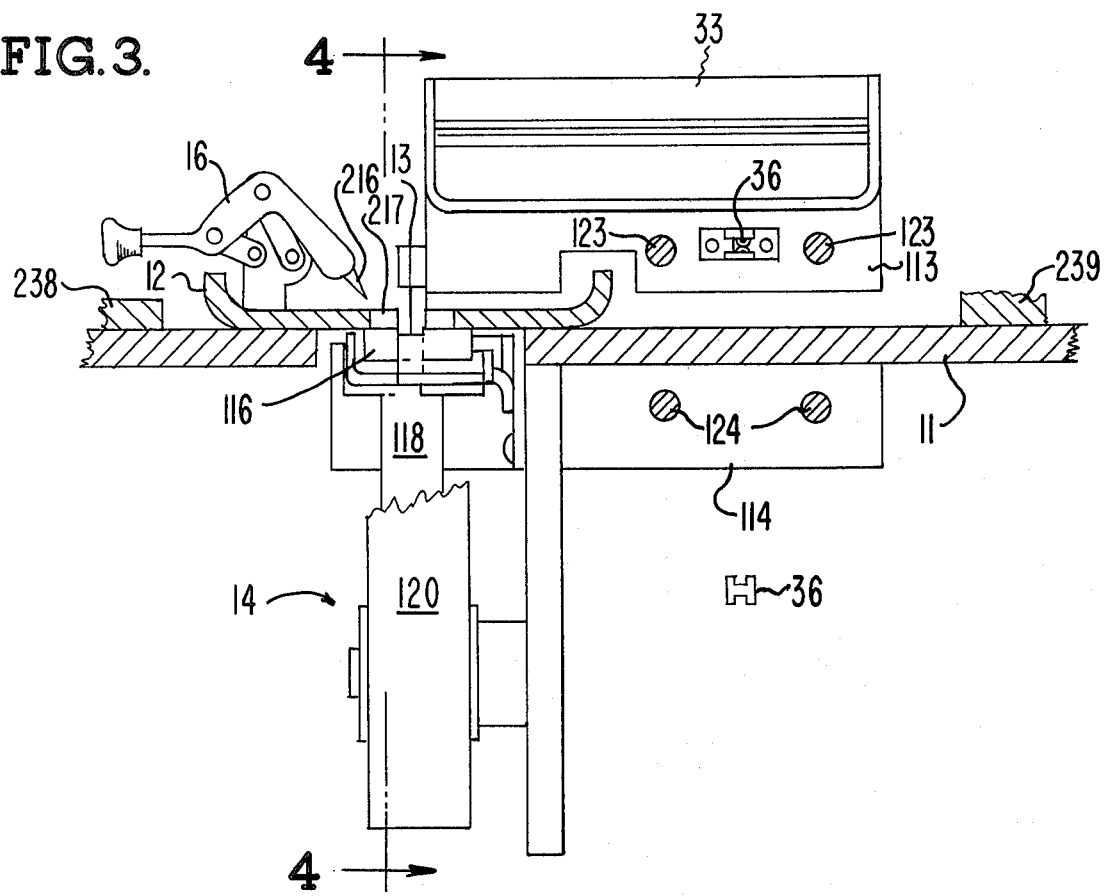
FIG. 3 is a side elevation of the carriage portion of the sheet butt splicer.

As will be seen in FIG. 3, the cutter blade 13 support block 113 and a support block for the tape applicator 14 both ride and are guided on guide rails 123 and 124 respectively. In the schematic of FIG. 1 these guide rails block a view of the chain 36 at those points where the rails lie parallel to and in the same plane as the chain 36. The application end mount of the tractor chain 36 to applicator block 114 is not shown in FIG. 3 because as will be seen from FIGS. 1 and 2, it is attached to the other end of the block 114.

The clamping structure 12 is a plate with a longitudinal aperature formed therein, as seen in FIG. 3. This permits the blade to penetrate the paper which is clamped between plates 11 and 12 when plate 12 is placed in the clamping position and latched therein by way of the latchscrew 41, FIG. 1, shown in the open position. When latched the screw will lock the top plate 12 to the bottom plate 11 when it is fastened to the frame of the splicer 10.

The blade 13, which may be a razor type blade, penetrates the paper and rests in a slot in the blade roller guide 116 which is carried by the block 114. This securely holds the paper as it is being cut. However, the selvage edges of the paper should be removed before taping the butt edges of the paper formed by the passing of the blade through the old and new plies of paper. An upper cam blade separates the old and new papers and causes the upper selvage to be pushed away. The upper cam blade 117, FIG. 4, cooperates with a lower blade 118 for trimming the selvage edges away. The lower blade is a flexible knife blade which rides against the separation point of the lower paper ply, and acts to peel back and away the lower ply selvage. The upper blade 117 and lower blade 118 are mounted on the upper and lower blocks 113 and 114, respectively.

The paper plies are now clamped together with the butt edges joined, the lower selvage being peeled away. This permits tape to be pressed against the paper at the butt edge intersection to join the two plies together. A roll of tape 120 is mounted on the tape applicator block 114. The tape 120 is drawn up over rollers which guide the tape to a presser roller 121. This roller, which may be formed of elastomer or of steel, presses the tape against the paper to join the edges of the paper.

The paper taped in this manner may be securely joined, but I have found that the improvement shown in FIG. 4, is to be preferred. This provides for two steel spring tangs, 132 and 133, staggered with respect to each other as shown in FIG. 4, which bear against the taped surface, one against one side and the other against the other side of the tape is very effective for securing the tape permanently to both sides of the butt edge joint.

It will be appreciated that the tape will be applied to the underside of the top plate 12 at those points where the tape has been drawn and where there is also no paper to be joined. Thus, in order to complete the joining process, the tape must be trimmed at the side edges of the paper web.

I have provided two cutters for this purpose. On the plate 12 of the clamp structure, I have mounted a blade for trimming the start edge of the table. This cutoff blade 216 by way of the dipper linkage shown in FIG. 3 will dip down into slot 217 and sever the tape which has been drawn across this slot 217. This is the start side of the paper web. It has been aligned with the path of the cutoff blade 216 by positioning lugs 238 and 239 mounted on the table plate 11.

When the blade 13 has been drawn across the paper, the blade block 113 is locked in the traverse end of travel with a latch, such as the gravity latch 241 when it drops into its groove 242 in the blade block 113.

At this point, the end cutoff for the tape may be actuated. It is positioned by moving its support block, 215 in FIG. 6, along the side edge of the table 11. A screw knob 218 may be tightened to fasten it in position.

The cutoff blade, 222 of trimming attachment 15, is spring 223 biased against a cam surface 224 which it follows as it is moved inwardly driven by the push rod 225. The rod may be manually moved, as shown, or actuated by solenoid or air cylinder. This alternative drive may also be used for trimming attachment 16.

When the blade 222 reaches a groove 226 in the plate 11, it will slit the tape from the ending side edge of the butt splice, freeing the paper.

The clamping structure may then be released from the table, permitting the paper to slide through the splicer, or be removed from it.

While I have described in detail my preferred embodiment, it will be understood that various modifications and rearrangements may be made thereto by those skilled in the art, both now and in the future. The scope of my invention should be interpreted by my appended claims.

What I claim is:
1. A sheet splicer comprising:
   a frame,
   a table mounted on said frame,
   clamping means pivotably mounted about a clamp axis on said frame to secure overlapping plies of the sheets to be joined against movement on said table,
   said table being pivotably mounted on a first side thereof said frame about an axis which is parallel to and spaced from the axis about which said clamping means is pivoted such that said sheets to be spliced may be laid on said table between a portion of the clamping means and said table,
   said table being spring biased at the second free end side thereof remote from the pivoted axis for said table and adjacent the axis about which said clamping means pivots,
   said clamping means having free end which is attached to be clamped to said frame adjacent the first side of the table adjacent the axis about which the table pivots,
   such that there is an equidistant interference clamping fit along the width of the table along the splice line of sheets to be joined by a butt splice in said splicer,
   a cutter mounted on guide rail means running parallel to said splice line and mounted above said clamping means
   having a blade mounted therein attached to be drawn through overlapping plies of sheets to be spliced along the splice line to sever the sheet plies and to define a butt edge end of the upper and lower plies of said sheets which are to be spliced,
   the opposite side of the defined cut of each ply being considered a selvage edge,
   splicing tape applicator means being mounted on guide rails beneath said tape, which guide rails are parallel to said splice line and mounted on said frame, said table applicator means being adapted to carry a splicing tape for joining the butt ends of the sheet together,
   having selvage edge removal means and spring means for pressing splicing tape drawn along said splice line to the butt edges of the sheets to be joined,
   the cutter and the applicator means being interconnected by a flexible position synchronization interlock extending from the cutter means around the pivot clamp axis of said clamping means down under said table about a second point and across under the table and around a third point and back across under the table to interconnect to said applicator means such that the clamping means may be unclamped and lifted from the table while pivoting about said clamp axis without disconnection of the flexible interlock.

2. A sheet splicer according to claim 1 having spaced leaf springs mounted on said splicing tape applicator means said leaf spring being mounted to press against the splicing tape ahead of a second leaf spring during application of said splicing tape to the underside of the sheets being joined.

3. A sheet splicer according to claim 1 wherein the interlock is a tractor chain drive mounted about pulleys so that movement of the blade during cutting pulls the tape application synchronously forward and in the same direction and for the same distance as that of blade travel and such that movement of the tape application in the opposite direction will pull the blade in a retract direction.

4. A sheet splicer according to claim 3 wherein the tractor chain along the spliced line is parallel to the splice line and parallel to the guide rails of both the cutter and splicing tape applicator.

5. A sheet splicer according to claim 1 wherein there is provided trimming cutter means carrying a blade and mounted on a dipper linkage which causes the cut off blade to dip into a cut off slot to sever the splicing tape at a point along the splice line selected by the operator.

6. A sheet splicer according to claim 5 wherein the trimming blade is positioned along the splice by positioning lugs mounted on the table.

* * * * *

UNITED STATES PATENT OFFICE
CERTIFICATE OF CORRECTION

Patent No. 4,094,727      Dated June 13, 1978

Inventor(s) Joseph M. Collins

It is certified that error appears in the above-identified patent and that said Letters Patent are hereby corrected as shown below:

Col. 4, Line 46, "tape" should read -- table --.

Col. 4, Line 48, "table" should read -- tape --.

Signed and Sealed this

Nineteenth Day of December 1978

[SEAL]

Attest:

RUTH C. MASON
*Attesting Officer*

DONALD W. BANNER
*Commissioner of Patents and Trademarks*